(12) United States Patent
Deluca et al.

(10) Patent No.: US 10,680,982 B2
(45) Date of Patent: Jun. 9, 2020

(54) PROVIDING CONTEXTUAL ALERTS

(71) Applicant: International Business Machines Corporation, Armonk, NY (US)

(72) Inventors: Lisa Seacat Deluca, Baltimore, MD (US); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/116,381

(22) Filed: Aug. 29, 2018

(65) Prior Publication Data

US 2020/0076749 A1    Mar. 5, 2020

(51) Int. Cl.
*H04L 12/58* (2006.01)
*H04W 4/12* (2009.01)
*H04W 4/16* (2009.01)

(52) U.S. Cl.
CPC ........... *H04L 51/043* (2013.01); *H04L 51/24* (2013.01); *H04L 51/36* (2013.01); *H04W 4/12* (2013.01); *H04W 4/16* (2013.01)

(58) Field of Classification Search
CPC .................................................. H04L 51/043
See application file for complete search history.

(56) References Cited

U.S. PATENT DOCUMENTS

| 6,016,478 | A | 1/2000 | Zhang et al. |
| 7,502,830 | B1 * | 3/2009 | Macias ............... H04L 51/04 709/206 |
| 8,862,666 | B2 | 10/2014 | Digate et al. |
| 2008/0134080 | A1 * | 6/2008 | Moore ................. G06F 9/451 715/786 |
| 2014/0143722 | A1 | 5/2014 | Pabla et al. |
| 2014/0358686 | A1 | 12/2014 | Tesler et al. |
| 2015/0046828 | A1 | 2/2015 | Desai et al. |

FOREIGN PATENT DOCUMENTS

WO    2014111951 A3    7/2014

* cited by examiner

*Primary Examiner* — Suraj M Joshi
(74) *Attorney, Agent, or Firm* — North Shore Patents, P.C.; Joseph L. Acayan

(57) ABSTRACT

Embodiments generally relate to alerts. In some embodiments, a method includes receiving, from a device of a first user, an alert request for an alert to be sent to the first user when a second user on a communication platform becomes available. The method further includes capturing context information for the first user in response to receiving the alert request. The method further includes associating the context information with the alert request. The method further includes determining that the second user is available on the communication platform. The method further includes sending the alert and the context information associated with the alert request to the computing device of the first user.

17 Claims, 5 Drawing Sheets

PROVIDING CONTEXTUAL ALERTS

BACKGROUND

Communication platforms such as messaging platforms, social network platforms, and collaborative platforms enable users to interact online throughout the day and over multiple days. Often times, a user will search for another user on a given communication platform only to learn that they are not available. Some platforms provide a service to let the user know when another user becomes available. However, often times, these users are not normally on one's contact list. Conventional communication platforms do not provide a way for the user to recognize the name or handle when the system indicates a user's availability.

SUMMARY

Disclosed herein is a method for providing contextual alerts, and system and computer program product as specified in the independent claims. Embodiments are given in the dependent claims. Embodiments can be freely combined with each other if they are not mutually exclusive.

In some embodiments, a method includes receiving, from a device of a first user, an alert request for an alert to be sent to the first user when a second user on a communication platform becomes available. The method further includes capturing context information for the first user in response to receiving the alert request. The method further includes associating the context information with the alert request. The method further includes determining that the second user is available on the communication platform. The method further includes sending the alert and the context information associated with the alert request to the computing device of the first user.

In another embodiment, the method further includes that the at least one processor further performs operations comprising capturing one or more of a date, a time, and the context information at the time the alert request is created. In another aspect, the context information comprises activity context information. In another aspect, the context information comprises cognitive context information. In another aspect, the method further includes: generating restore levels associated with a state of the device of the first user at the time the alert request is created; and restoring the device of the first user based on at least one of the restore levels. In another aspect, the method further includes summarizing context information to be displayed to the first user with the alert. In another aspect, the method further includes causing the alert to be displayed with the context information on the device of the first user.

DETAILED DESCRIPTION

Embodiments described herein provide contextual alerts to a user in order to facilitate communication on a communication platform. Embodiments provide a user with a contextual alert when a second user on a communication platform becomes available, where the contextual alert includes context to remind the first user why the first user wanted to communicate with the second user.

In some embodiments, a system receives, from a device of a first user, an alert request for an alert to be sent to the first user when a second user on a communication platform becomes available. The system further captures context information for the first user in response to receiving the alert request. As described in more detail herein, context information may include a screen shot of the application that user U1 was working on at the time the alert request was sent, for example. The system further associates the context information with the alert request. When the system determines that the second user is available on the communication platform, the system sends the alert and the context information associated with the alert request to the computing device of the first user. The context information provides a helpful reminder as to why user U1 wanted to contact user U2.

Figure 1:
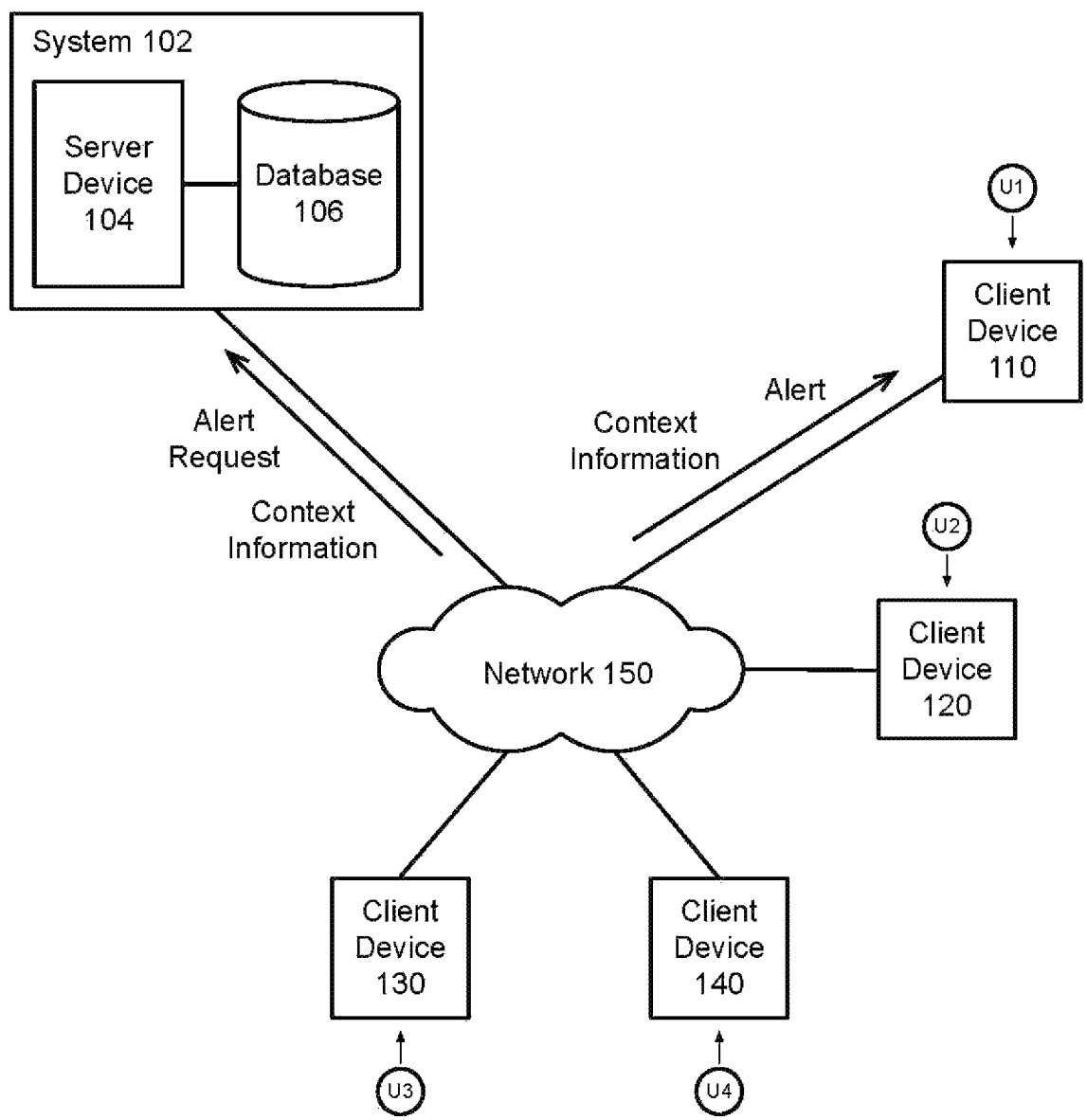
FIG. 1 is an example environment for providing contextual alerts, according to some embodiments.

FIG. 1 is an example environment 100 for providing contextual alerts, according to some embodiments. Shown is a system 102, which includes a server device 104 and a database 106. In various implementations, system 102 may provide a communication platform through which users U1, U2, U3, and U4 may interact with each other and with system 102 using respective client devices 110, 120, 130, and 140.

In various embodiments, environment 100 may be, for example, a collaborative network environment, a social network environment, a chat environment, an email environment, etc. In various embodiments, server device 104 may communicate with client devices 110, 120, 130, and 140 via wired and/or wireless connections associated with any suitable network such as the Internet, an intranet, or combination of networks.

As described in more detail herein, if a user such as user U1 attempts to communicate with another user such as user U2 but user U2 is unavailable, the client device of user U1 may send an alert request to system 102 to alert user U1 when user U2 is available (e.g., online, active on the communication platform, etc.). When system 102 receives the alert request, system 102 captures and stores various aspects of the state of client device 110, referred to as context information. The context information may include a screen shot of the application that user U1 was working on at the time the alert request was sent, for example. When user U2 becomes available, system 102 sends an alert and the context information. The context information helps to remind user LT1 as to why user U1 wanted to contact user U2. Example embodiments directed to the operation of system 102 and client devices 110, 120, 130, and 140 are described in more detail herein.

For ease of illustration, FIG. 1 shows one block for each of system 102, server device 104, and database 106, and shows four blocks for client devices 110, 120, 130, and 140. Blocks 102, 104, and 106 may represent multiple systems, server devices, and databases. Also, there may be any number of client devices. In other implementations, environment 100 may not have all of the components shown and/or may have other elements including other types of elements instead of, or in addition to, those shown herein.

While the server 102 performs embodiments described herein, in other embodiments, any suitable component or combination of components associated with the server 102 or any suitable processor or processors associated with the server device 104 may facilitate performing the embodiments described herein. In various embodiments, the environment 100 may not have all of the components shown and/or may have other elements including other types of components instead of, or in addition to, those shown herein.

Figure 2:
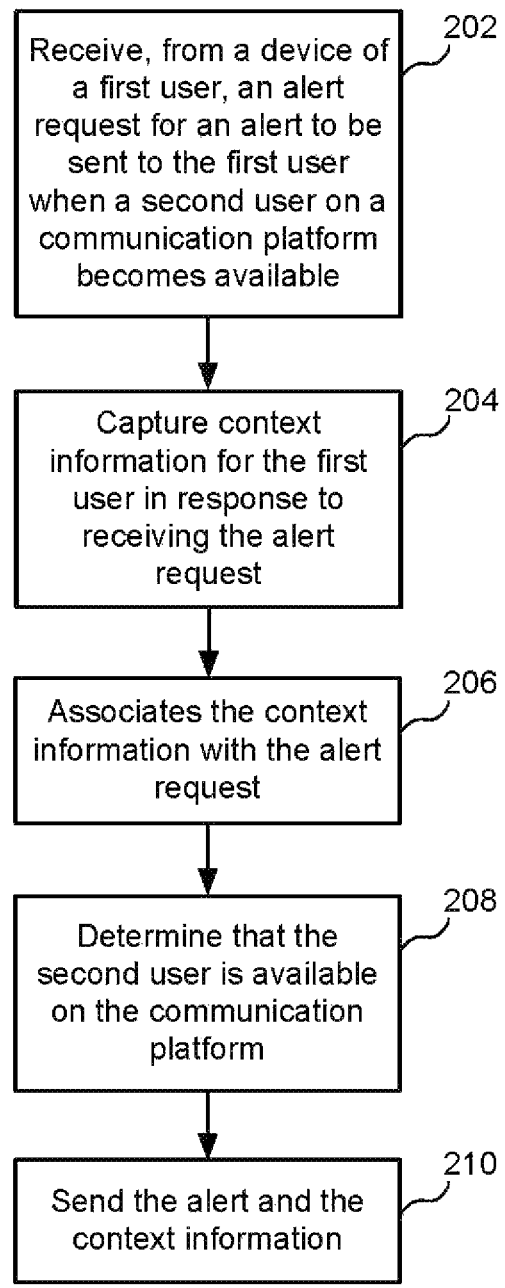
FIG. 2 is an example flow diagram for providing contextual alerts, according to some embodiments.

FIG. 2 is an example flow diagram for providing contextual alerts, according to some embodiments. For ease of illustration and clarity, the user trying to initiate communication (e.g., user U1 in the example above) is referred to as the first user. The user whom the first user is trying to communicate with (e.g., user U2 in the example above) is referred to as the second user. As described in more detail herein, the system provides the first user with a contextual alert when the second user becomes available on a communication platform, where the contextual alert includes context to remind the first user why he or she wanted to communicate with the second user.

Referring to both FIGS. 1 and 2, a method begins at block 202, where a system receives, from a client device of a first user, an alert request for an alert to be sent to the first user when a second user on a communication platform becomes available. The terms "client device of the user" and "device of the user" may be used interchangeably. In various embodiments, the second user on a communication platform becoming available may be a condition for sending the alert. In some embodiments, the system enables the first user to set the alert for each user who could not be contacted. For example, the system may prompt the first user if the first user wants an alert (e.g., "Would you like to set an alert for when this person is available?").

At block 204, the system captures context information for the first user in response to receiving the alert request. In various embodiments, the system captures one or more of a date, a time, and the context information at the time the alert request is created. Further example embodiments are described in more detail herein. In some embodiments, the context information comprises activity context information. For example, activity context information may include websites open, emails open, files that are open, etc. at the time the alert request is sent from the device of the first user to the system. In various embodiments, the activity context information may also include a screenshot of the entire screen with applications and windows in their current state, and/or one or more videos open at the point in time leading up to the alert request. As described in more detail herein, such context information may be captured in a partial restore or a complete restore of the operating system to where the first user was when triggering the alert request. In some embodiments, the context information may also include comments by the first user explaining one or more reasons for initiating an alert request. The captured context information may be stored in a database such as database 106 of FIG. 1 or in any suitable database accessible by system 102.

In some embodiments, the context information comprises cognitive context information. For example, cognitive context information may include how the first user is feeling at the moment, the user's current sentiment, biometrics, etc.

In some embodiments, the system may restore the state of the device at varying degrees or levels, or restore levels. Each restore level may cover one or more aspects of a state of the device of the first user at the time the alert request is created. As described in more detail herein, the restore levels may include a complete restore, a partial restore, and at least one screen shot. For example, the system may completely or partially restore the device. Further example embodiments are described in more detail herein in connection with FIG. 4.

At block 206, the system associates the context information with the alert request. With the context information associated with the alert request, the system may then store the context information (e.g., aspects of state of the device, etc.) with the condition for sending the alert in association with the alert request.

In some embodiments, the system may summarize the context information to be displayed to the first user with the alert. For example, the system may generate a statement summarizing particular aspects of the state of the device of the first user at the time the alert request was sent from the device to the system (e.g., "You were searching for these key words in the search engine," etc.).

At block 208, the system determines that the second user is available on the communication platform. For example the system may detect when the second user logs into and interacts the communication platform and/or interacts with another user on the communication platform.

At block 210, the system sends the alert and the context information associated with the alert request to the device of the first user. By sending the alert and context information to the device of the first user, the system causes the alert to be displayed with the context information on the device of the first user. In some embodiments, the system causes the alert to be displayed or presented to the first user, and provides an option for the user to select and open the context information. For example, the system may prompt the first user if the first user wants see the context information (e.g., "Bob is now available. Would you like to open context information associated with the alert?").

There may be instances where the first user remembers why the first user wanted to contact the second user. As such, the context information may not be necessary. As described in more detail herein, the system may enable the user to request different amounts or levels of context information.

In an example scenario, Jane is new to writing code in a particular programming language. Jane searches the communication platform for words associated with the particular programming language. Jane finds a few people that have matches in their profile, where she has never spoken to them before. She looks them up and everyone is offline. The system enables her to set an alert for them to tell her when they come onto the communication platform. Some time passes, and Jane she does the same thing for another project she is working on. In various embodiments, the system enables her to set multiple alerts for users associated with the other project, as well. When any of these users become available, the system sends Jane an alert along with the context information associated with each alert request.

Figure 3:
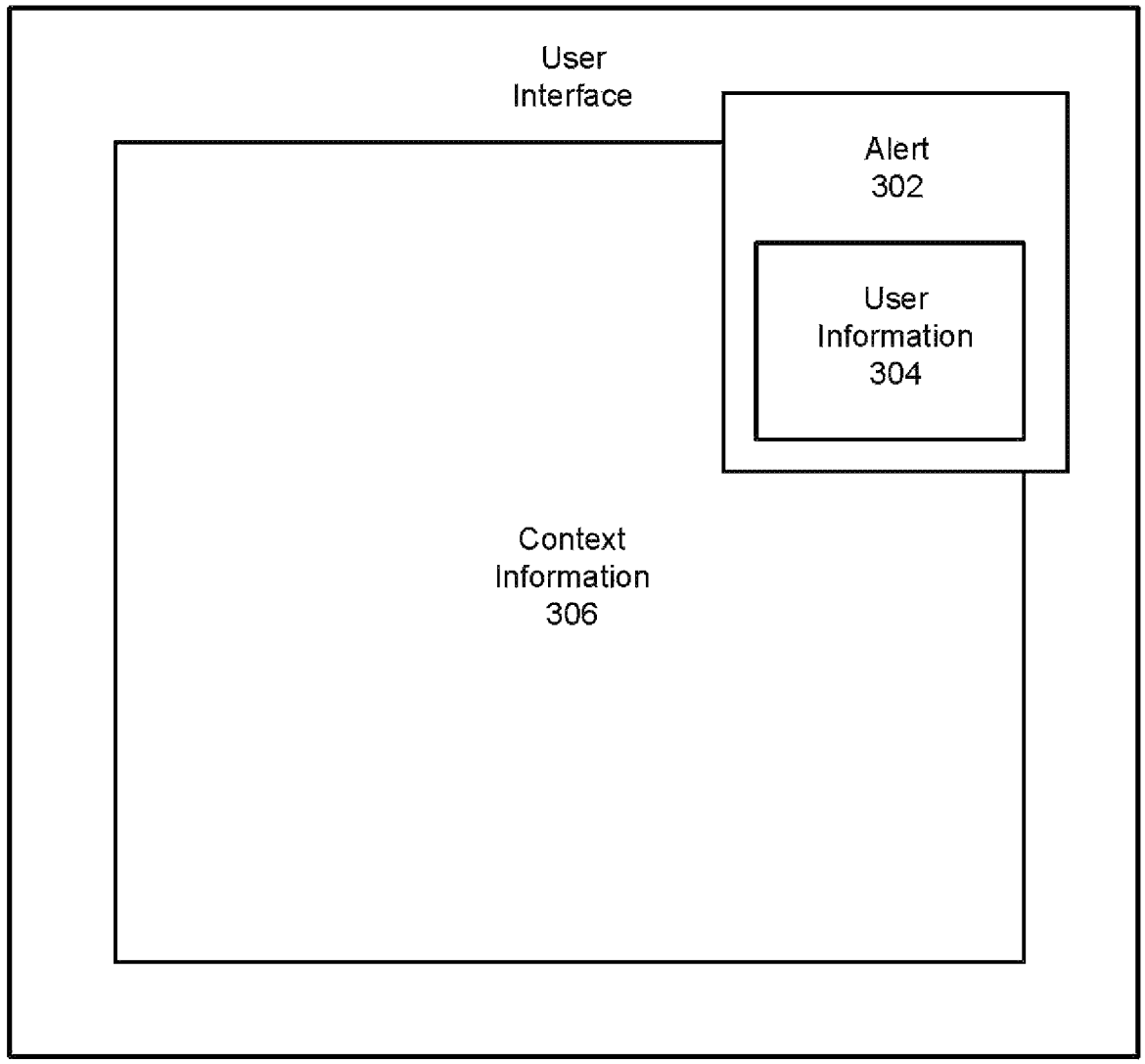
FIG. 3 illustrates a block diagram of an example user interface showing an alert with user information and context information, according to some embodiments.

FIG. 3 illustrates a block diagram of an example user interface 300 showing an alert 302 with user information 304 and context information 306, according to some embodiments. As shown, alert 302 is displayed with context information 306. In some embodiments, user information may include various information associated with the second user. For example, such information may include the user name, title, phone number, email address, handle, etc. In various embodiments, the context information 306 may be a screenshot of a browser showing what the first user was interacting with at the time the alert request was sent from the device of the first user to the system. This refreshes the memory of the first user when trying to remember why the first user was trying to contact the second user.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
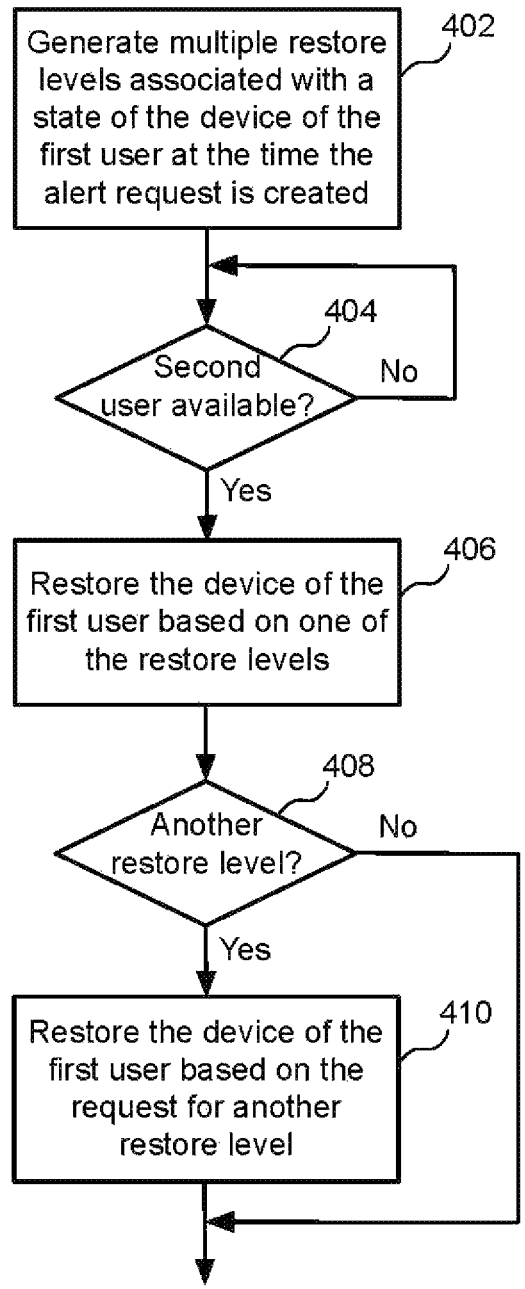
FIG. 4 is an example flow diagram for providing different restore levels, according to some embodiments.

FIG. 4 is an example flow diagram for providing different restore levels, according to some embodiments. As described in more detail herein, the system provides a user with a contextual alert when a second user on a communication platform becomes available, where the contextual alert may include one or more restore levels to the first user. Referring to both FIGS. 1 and 4, a method begins at block 402, where a system such as system 102 generates multiple restore levels associated with a state of the device of the first user at the time the alert request is created. The system generates the restore levels in response to receiving the alert request.

At block 404, the system determines if the second user is available on the communication platform. The system continues to wait until the second user is available on the communication platform. As indicated above, the system may detect when the second user logs into and interacts in the communication platform and/or interacts with another user on the communication platform, for example.

At block 406, the system restores the device of the first user based on at least one of the restore levels upon detecting that the second user is available on the communication platform. This causes the first device of the first user to display the restore level. For example, the system may restore the device to a partial restore. In some embodiments, the partial restore may be a screenshot of the application or browser at the time the alert request was received by the system. The system may capture multiple screenshots for different applications open at the time the alert request was sent.

At block 408, the system determines if the user requests another restore level. For example, if, after looking at the screenshot, the first user still does not remember why the first user wanted to contact the second user, the system may enable the first user to request more contextual information. For example, in addition to the screenshot, the user may want the system to perform a partial restore, which may restore an application or session to the state when the alert request was initially sent.

At block 410, if the user requests another restore level, the system restores the device of the first user based on the request for another restore level requested by the user. The system enables the user to select another restore level. The system may show the first user the application or session to the state when the alert request was initially sent. The system may enable the first user to request additional context information as needed to remember the purpose of the communication. For example, the system may restore an application and/or browser to the previous state at the time the alert request was made. In this example of a partial restore, the system may pull up the browser, including tabs with pages that the first user was looking at when the alert request was received by the system.

In some scenarios, the first user may request a complete restore of the device, which may include restoring all applications, including the browser, of the device to the state at the time the alert request was received by the system. Such a scenario may be less likely. However, such a scenario may be helpful if the first user wants to see specific details of a particular aspect of the previous state. For example, the first user may want to see particular lines of code they were writing at the time, etc.

In various embodiments, if the system does not receive a request for more context information for a predetermined time period (e.g., 1 minute, 2 minutes, etc.), the system may determine that the initial context information was sufficient to refresh the memory of the first user as to why the first user wanted to communicate with the second user. In various embodiments, the system may cause the device of the first user to go back to the current state (before the alert was sent to the device).

In some embodiments, if the first user does not attempt to contact the second user or is not successful, the system may send an alert at a future time. This may be done automatically, without user intervention. Or, the system may enable the first user to request another alert request for the next time the second user is availability. In some embodiments, the system may include the original context information with the subsequent alert.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
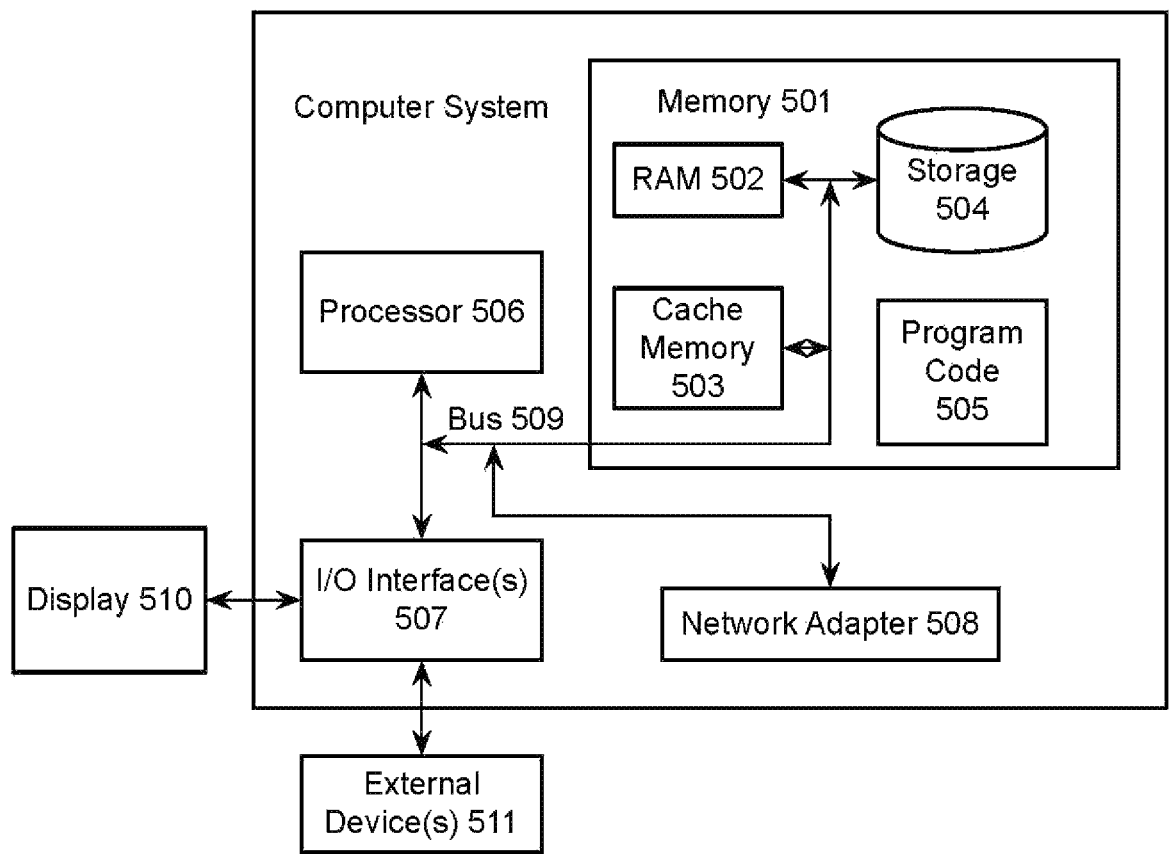
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
at least one processor and a computer readable storage medium having program instructions embodied therewith, the program instructions executable by the at least one processor to cause the at least one processor to perform operations comprising:
receiving, from a device of a first user, an alert request for an alert to be sent to the first user when a second user on a communication platform becomes available;
capturing context information for the first user in response to receiving the alert request, wherein the context information comprises cognitive context information;
associating the context information with the alert request;
determining that the second user is available on the communication platform;
sending the alert and the context information associated with the alert request to the computing device of the first user.

2. The system of claim 1, wherein the at least one processor further performs operations comprising capturing one or more of a date, a time, and the context information at the time the alert request is created.

3. The system of claim 1, wherein the context information comprises activity context information.

4. The system of claim 1, wherein the at least one processor further performs operations comprising:
generating restore levels associated with a state of the device of the first user at the time the alert request is created; and
restoring the device of the first user based on at least one of the restore levels.

5. The system of claim 1, wherein the at least one processor further performs operations comprising summarizing context information to be displayed to the first user with the alert.

6. The system of claim 1, wherein the at least one processor further performs operations comprising causing the alert to be displayed with the context information on the device of the first user.

7. A computer program product comprising a computer readable storage medium having program instructions embodied therewith, the program instructions executable by at least one processor to cause the at least one processor to perform operations comprising:
receiving, from a device of a first user, an alert request for an alert to be sent to the first user when a second user on a communication platform becomes available;
capturing context information for the first user in response to receiving the alert request, wherein, the context information comprises cognitive context information;
associating the context information with the alert request;
determining that the second user is available on the communication platform;
sending the alert and the context information associated with the alert request to the computing device of the first user.

8. The computer program product of claim 7, wherein the at least one processor further performs operations comprising capturing one or more of a date, a time, and the context information at the time the alert request is created.

9. The computer program, product of claim 7, wherein the context information comprises activity context information.

10. The computer program product of claim 7, wherein the at least one processor further performs operations comprising:
generating restore levels associated with a state of the device of the first user at the time the alert request is created; and
restoring the device of the first user based on at least one of the restore levels.

11. The computer program product of claim 7, wherein the at least one processor further performs operations comprising summarizing context information to be displayed to the first user with the alert.

12. The computer program product of claim 7, wherein the at least one processor further performs operations comprising causing the alert to be displayed with the context information on the device of the first user.

13. A computer-implemented method for providing an alerts, the method comprising:
receiving, from a device of a first user, an alert request for an alert to be sent to the first user when a second user on a communication platform becomes available;
capturing context information for the first user in response to receiving the alert request, wherein the context information comprises cognitive context information;
associating the context information with the alert request;
determining that the second user is available on the communication platform;
sending the alert and the context information associated with the alert request to the computing device of the first user.

14. The method of claim 13, wherein the at least one processor further performs operations comprising capturing one or more of a date, a time, and the context information at the time the alert request is created.

15. The method of claim 13, wherein the context information comprises activity context information.

16. The method of claim 13, further comprising:
generating restore levels associated with a state of the device of the first user at the time the alert request is created; and
restoring the device of the first user based on at least one of the restore levels.

17. The method of claim 13, further comprising summarizing context information to be displayed to the first user with the alert.

* * * * *